2 Sheets—Sheet 1.
I. BRACH.
Water-Purifier.
No. 203,110. Patented April 30, 1878.
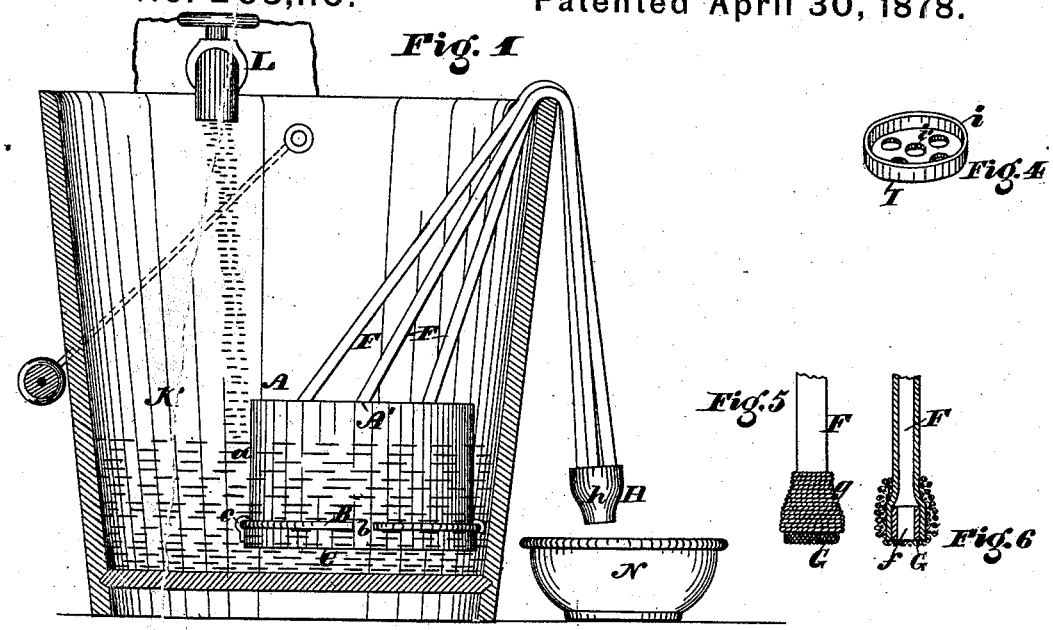
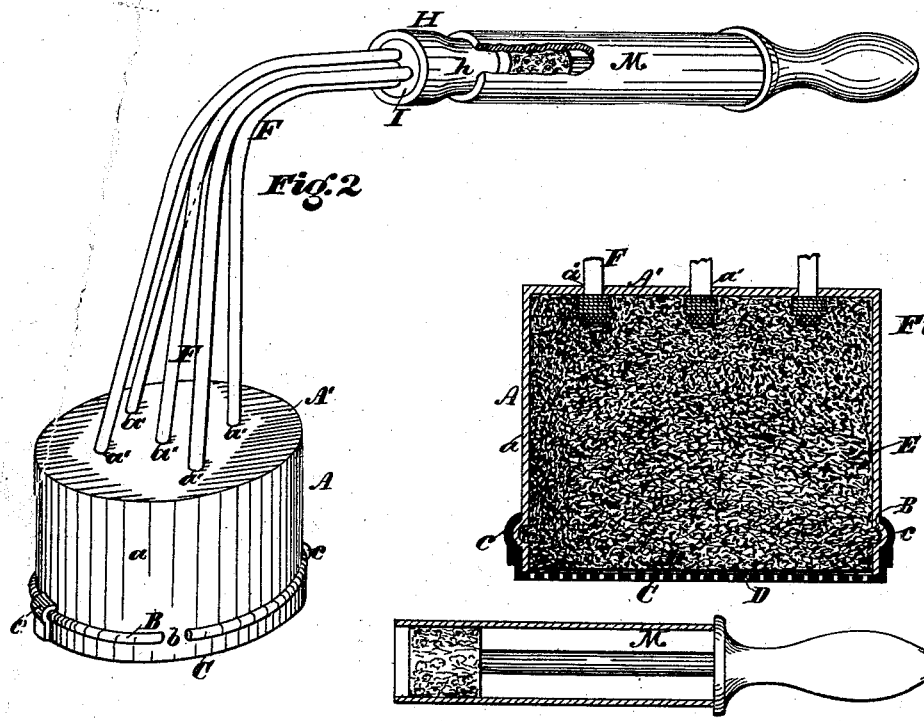
WITNESSES:
Saml. J. Van Stavoren
J. B. Connolly
INVENTOR
Isidor Brach,
By Connolly Bros., ATTORNEYS.
N. PETERS, PHOTO-LITHOGRAPHER, WASHINGTON, D.C.

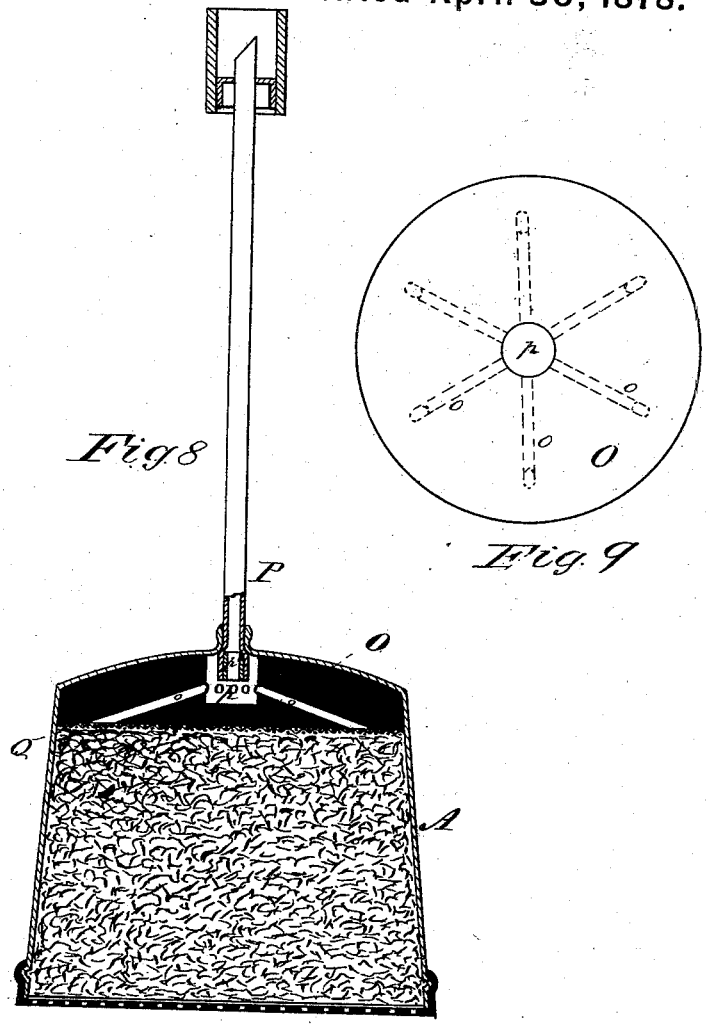

UNITED STATES PATENT OFFICE.

ISIDOR BRACH, OF PHILADELPHIA, PENNSYLVANIA.

IMPROVEMENT IN WATER-PURIFIERS.

Specification forming part of Letters Patent No. 203,110, dated April 30, 1878; application filed March 25, 1878.

*To all whom it may concern:*

Be it known that I, ISIDOR BRACH, of Philadelphia, in the county of Philadelphia and State of Pennsylvania, have invented certain new and useful Improvements in Water-Purifiers; and I do hereby declare the following to be a full, clear, and exact description of the invention, such as will enable others skilled in the art to which it pertains to make and use it, reference being had to the accompanying drawings, which form part of this specification, in which—

Figure 1 is a side elevation of the improvement herein described applied to a vessel, the latter being in section. Fig. 2 is a perspective of my improvement with the starting-pump applied thereto. Fig. 3 is a vertical longitudinal section of the purifying-chamber; and Figs. 4, 5, 6, and 7 are detail views. Figs. 8 and 9 are modifications.

My invention has for its object to provide a portable water-purifier, operating to remove water from one vessel to another, and to purify the same in the act of removal.

My invention consists of a box or vessel having a foraminated bottom, and with a top pierced for the reception of a conducting tube or tubes, said vessel being filled with loose carbonaceous or mineral matter having the properties of a purifying medium. Over the foraminated bottom, and between the same and the purifying material, is located a diaphragm, of silk or other fabric, adapted to act as a strainer. The ends of the conducting-tubes below the top of the purifying-chamber are covered with fine wire-gauze, retained in position by wrapping. Where (as is generally intended) the conducting-tubes are flexible, a short piece of metallic pipe is inserted in the ends of each of such tubes, to stiffen the same against the wire-gauze and wrapping.

In practice I prefer to employ a number of conducting-tubes of small diameter, rather than one large tube, in order to distribute the impurities in the water throughout the filtering medium, rather than to concentrate such impurities in one place, as would be the effect of using one such large tube only.

Where two or more conducting-tubes are employed, their outer extremities are collected in a single joint or union, composed of a short section of tubing having a transverse diaphragm, with openings for the passage of said conducting-tubes.

Referring to the accompanying drawing, A designates the purifying-chamber, composed of a metallic vessel having side walls $a$ and top $A'$. On the side walls $a$ is formed a bead, B, which is interrupted or provided with passages $b\ b$ on two opposite sides.

C is the foraminated bottom, held in place on the vessel A by lugs $c\ c$, which enter through the passages $b\ b$, and clamp upon the bead B. D is a diaphragm, of silk or other material, resting above the bottom C and below the loose carbonaceous or mineral matter E, which serves as the purifying medium, filling the vessel A, as shown. The top $A'$ has one or more openings, $a'\ a'$, through which are passed flexible india-rubber tubes F F, the extremities of said tubes below the top $A'$ having inserted in them a short stiffening-piece of metallic tubing, $f$, and being covered by fine wire-gauze G, held in place by a wrapping of cord, $g$, said wire-gauze preventing the purifying material from entering the conducting-tubes F.

H is a union, in which the outer ends of the conducting-tubes F (where two or more of said tubes are employed) are collected, said union consisting of a short section of india-rubber tubing, $h$, having a diaphragm, I, with annular flange $i$ and openings $i'$ for the reception of the ends of said conducting-tubes.

The operation is as follows: A pail or other vessel, K, is placed below the cock of a hydrant, L, or other conveyer from which water flows, as shown in the drawing. The chamber A is wholly or partly immersed in the water in said vessel, its bottom C being sufficiently elevated above the bottom of the pail, as shown, to permit the free inflow of water to the purifying medium. A small and simply-constructed pump, M, is then used to start the flow of water in the conducting-tubes, after which said tubes are bent or permitted to drop, so as to form siphons, as shown in Fig. 1. The water will then continue to flow out of the pail A into any suitable receptacle, N, being purified in its passage through the purifying medium.

When from long use the purifying medium becomes foul, it may be emptied out of the vessel A by removing the bottom C. The filtering medium may be then cleansed and replaced, or fresh carbonaceous or mineral matter may be substituted for it. One conducting-tube only may be employed instead of the series shown; but in every case such tube or tubes will proceed from the top of the vessel A, forming an exit passage or passages for the water which enters said vessel through the foraminated bottom.

I am aware that water-filters have been heretofore known and used—for example, those shown in Letters Patent of the United States dated, respectively, June 8, 1875, and September 28, 1876. Said patents show filters for attachment to the nozzle of a hydrant, and are different in construction and method of operation from that herein described.

Instead of using several tubes and effecting their union outside of the purifying-vessel, but a single conducting-tube may be used and the same result obtained—i. e., drawing from various portions of the vessel.

In Fig. 8 of the drawings, O represents a block of clay, which rests upon the loose purifying material, said block having numerous oblique radial openings o, which lead to a common central socket or well, p. P is a single conducting-tube, which passes through a central opening in the top of the purifying-vessel, and has inserted in its end a piece of stiff pipe, p', which prevents the tube P from being withdrawn. The end of said tube P enters the well p, and, when suction is applied, the liquid is drawn through the openings o and enters said tube, the latter being then made to assume a siphon shape and acting as already described.

To prevent the loose purifying material from entering the openings o, a screen or cloth, Q, may be interposed between the block O and said material.

What I claim as my invention is—

1. The vessel A, having top A' with opening or openings a' and bead B, in combination with the foraminated bottom C, with lugs c, substantially as shown and described.

2. In combination with a purifying-vessel, A, having a carbonaceous or mineral filling, two or more conducting tubes or channels, F, for the purpose of drawing water at different points or places from said vessel and distributing the impurities throughout the filtering medium, as set forth.

3. In combination with a series (two or more) of conducting-tubes, F, a union, H, consisting of section h, having a transverse diaphragm, with opening i, substantially as shown and described.

4. In combination with conducting tube or tubes F, the stiffening-piece f, wire-gauze G, and wrapping g, substantially as shown and described.

5. The combination of vessel A, having top A' and removable foraminated bottom C, conducting-tubes F, and union H, constructed, arranged, and operating substantially as shown and described.

In testimony that I claim the foregoing I have hereunto set my hand this 20th day of February, 1878.

ISIDOR BRACH.

Witnesses:
SAML. J. VAN STAVOREN,
CHAS. F. VAN HORN.